United States Patent
Gwosdz et al.

(10) Patent No.: US 11,543,898 B2
(45) Date of Patent: Jan. 3, 2023

(54) HAND-GUIDED TREATMENT DEVICE WITH OPERATING ELEMENT AND DISPLAY FIELD

(71) Applicant: Andreas Stihl AG & Co. KG, Waiblingen (DE)

(72) Inventors: Fabian Gwosdz, Schorndorf (DE); Georg Heinzelmann, Winnenden (DE); Alexander Trenn, Tischardt (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 17/174,609

(22) Filed: Feb. 12, 2021

(65) Prior Publication Data
US 2021/0255715 A1 Aug. 19, 2021

(30) Foreign Application Priority Data
Feb. 14, 2020 (EP) .................... 20157306

(51) Int. Cl.
*G06F 3/0338* (2013.01)
*B25F 5/02* (2006.01)
(Continued)

(52) U.S. Cl.
CPC ............ *G06F 3/0338* (2013.01); *B25F 5/02* (2013.01); *B27B 17/0008* (2013.01); *H05K 5/0017* (2013.01)

(58) Field of Classification Search
CPC .......... A01G 3/053; A01G 3/08; A01G 3/083; A01G 3/085; B23D 57/023; B24B 23/005;
(Continued)

(56) References Cited

U.S. PATENT DOCUMENTS 9,555,537 B2   1/2017 Iwata et al.
2010/0218386 A1* 9/2010 Roßkamp ............. A01G 3/053
                                                   30/277.4
(Continued)

FOREIGN PATENT DOCUMENTS

DE          43 18 980 C2    7/2000
DE   20 2011 110 069 U1    4/2013
(Continued)

OTHER PUBLICATIONS

German-language European Search Report issued in European Application No. 20157306.0 dated Sep. 7, 2020 with partial English translation (six (6) pages).

*Primary Examiner* — Nelson M Rosario
(74) *Attorney, Agent, or Firm* — Crowell & Moring LLP (57) ABSTRACT

A hand-guided treatment device is configured for use in working positions tilted relative to each other by a tilt angle of at least 45° about a device longitudinal axis. The device has a device housing, a handle operating unit with a handle extending with a main direction component parallel to the device longitudinal axis and a finger-operable operating element within finger reach of the handle, and a display field arranged on an outside of the device housing with at least one optical display element. The display field is arranged offset relative to the operating element in a housing circumferential direction about the device longitudinal axis and extends in the housing circumferential direction over a housing edge and/or with a curved or kinked course.

15 Claims, 5 Drawing Sheets

(51) Int. Cl.
*B27B 17/00* (2006.01)
*H05K 5/00* (2006.01)

(58) Field of Classification Search
CPC .......... B25F 5/02; B25F 5/00; B27B 17/0008;
G06F 3/0338; H05K 5/0017; B23Q
11/0078; F16P 3/00
See application file for complete search history.

(56) References Cited

U.S. PATENT DOCUMENTS

| | | |
|---|---|---|
| 2014/0166323 A1* | 6/2014 | Cooper .................. F16P 3/148 173/1 |
| 2014/0190713 A1 | 7/2014 | Martinsson et al. |
| 2015/0155606 A1 | 6/2015 | Stickney et al. |
| 2015/0209951 A1 | 7/2015 | Lutz et al. |
| 2017/0072523 A1* | 3/2017 | Gerstenberger .......... B25F 5/00 |
| 2017/0089349 A1 | 3/2017 | Bylund et al. |

FOREIGN PATENT DOCUMENTS

| | | |
|---|---|---|
| EP | 2 910 342 A2 | 8/2015 |
| EP | 3 117 964 A1 | 1/2017 |
| WO | WO 2013/032374 A1 | 3/2013 |
| WO | WO 2013/182838 A1 | 12/2013 |
| WO | WO 2015/161997 A1 | 10/2015 |

\* cited by examiner

HAND-GUIDED TREATMENT DEVICE WITH OPERATING ELEMENT AND DISPLAY FIELD

CROSS REFERENCE TO RELATED APPLICATION

This application claims priority under 35 U.S.C. § 119 from European Patent Application No. 20157306.0, filed Feb. 14, 2020, the entire disclosure of which is herein expressly incorporated by reference.

BACKGROUND AND SUMMARY OF THE INVENTION

The invention concerns a hand-guided treatment device which is configured for use in working positions tilted relative to each other by a tilt angle of at least 45° about a device longitudinal axis, and has a device housing, a handle operating unit which comprises a handle extending with a main direction component parallel to the device longitudinal axis and a finger-operable operating element within finger reach of the handle, and a display field arranged on an outside of the device housing with at least one optical display element.

Hand-guided treatment devices of this type are used in particular as motorized devices in gardening and forestry, such as power saws, hedge trimmers, leaf blowers, strimmers etc., and in the construction and Do-It-Yourself (DIY) sector as disc cutters or angle grinders, jigsaws, grinding machines, etc. In their intended working operation, the devices may assume at least two different working positions which are tilted relative to each other by 45° about the longitudinal axis of the device. Thus for example in sawing operation, a power saw may optionally be held in a vertical cutting position and in a horizontal cutting position tilted relative thereto by 90° about the saw longitudinal axis, and also in intermediate positions. The same applies to the other devices listed above as examples.

Using the finger-operable operating element situated within finger reach of the handle, the user can activate a function assigned to this operating element with one finger of the hand with which he grips the device at the handle. This function may in particular be one which stands in relation to an intended working purpose of the treatment device, such as a switch-on/off function for the device or a drive motor of the device which drives a treatment tool of the device.

The optical display element(s) of the display field may serve respective desired display functions, wherein preferably at least one of these display functions is related to the function which can be triggered via the finger-operable operating element, for example such that such an optical display element serves to display the state of the device, or more particularly of a treatment tool of the device, which the user has selected via the finger-operable operating element.

Laid-open publications US 2017/0089349 A1 and WO 2013/032374 A1 and patent publications U.S. Pat. No. 9,555,537 B2 disclose treatment devices of this type, in particular in the form of a power saw, a strimmer, hedge shears or a leaf blower, in which one or more pushbutton operators, which the user can actuate for example using the thumb of his hand holding the handle, and several light-emitting diode (LED) display elements are integrated in a common, combined, flat operating and display panel which, towards the front in the device longitudinal direction, adjoins a handle running in the device longitudinal direction.

In this and other treatment devices with differently tilted working positions, there is often a desire to be able to display certain device states or device functions to the user optically via the display field such that the display concerned remains easily perceptible to the user not only in one but in several working positions of the device, preferably also in working positions tilted by 45° or more about the device longitudinal axis, e.g. without the user needing to turn his head.

In laid-open publication EP 2 910 342 A2, to this end in a hand-held power tool, in particular an angle grinder, a display unit is proposed with a display element which extends over at least part of the periphery of a housing unit.

Similarly, patent publication DE 43 18 980 C2 discloses, for a hand-held power tool such as a drill or angle grinder, a display device with a light conductor which runs as a closed ring around a device housing, and over its periphery has several optical display elements that can be activated successively in the rotational direction of a rotating tool of the device in order to indicate the rotational direction. The angle grinder can be switched on and off and its rotational direction changed via a operating switch situated before the light conductor ring in the longitudinal direction of the device. Two further individual display elements are situated in front of the operating switch in the device longitudinal direction.

It is the technical object of the invention to provide a hand-guided treatment tool of the type cited initially which has improved characteristics in comparison with the above-mentioned prior art, in particular with respect to functionality and/or configuration of the display field and its relation to the finger-operable operating element.

The invention achieves this and other objects by providing a motorized treatment device, preferably a gardening or forestry device, said device being configured for use in working positions tilted relative to each other by a tilt angle of at least 45° about a device longitudinal axis, and comprising a device housing, a handle operating unit which comprises a handle extending with a main direction component parallel to the device longitudinal axis and a finger-operable operating element within finger reach of the handle, and a display field arranged on an outside of the device housing with at least one optical display element. According to the invention, the display field is arranged offset relative to the operating element in a housing circumferential direction about the device longitudinal axis, and extends in the housing circumferential direction over a housing edge and/or with a curved or kinked course.

This configuration and arrangement of the display field makes it easier for the user to perceive a display provided by the optical display element in the different working positions of the treatment device. This above all ensures that the extent of the display field is not restricted to a flat display plane, but the display field extends in the circumferential direction of the device housing over a housing edge and/or with a curved or kinked course in the housing circumferential direction. In this way, the display field remains visible to the user even when he tilts the device about its longitudinal axis in order to move it from one working position to another while working.

Also, the special positional relation of the display field with respect to the finger-operable operating element is advantageous, wherein the display field is arranged offset relative to the operating element in the housing circumferential direction about the device longitudinal axis. This makes it easier for the user to actuate the operating element using a finger, without the operating finger or associated hand obstructing the clear visibility of the display field for the user. This configuration also allows the display field and finger-operable operating element to be positioned close to each other and at a substantially equal axial distance from the handle, or both directly adjoining this.

In a refinement of the invention, the handle operating unit has a finger operating surface area in which the operating element is situated, and the display field contains a first display surface area and a second display surface area not parallel to the first. The finger operating surface area and the first display surface area are arranged aligned adjacent to each other and/or next to each other with mutually parallel face planes.

This constitutes an advantageous design of the display field. The two non-parallel display surface areas make it easier for the user to have a direct view of the display field in the tilted working positions, e.g. because the first display surface area is directly visible in a first working position and the second display surface area is directly visible in a second working position of the device which is tilted relative to the first. The first display surface area of the display field adjoins the finger operating surface area in aligned fashion and/or with parallel face planes, whereby a smooth transition is achieved between the two device components without perceptible steps or protrusions. In alternative embodiments, the display field contains only a single flat or curved display surface area, and/or is arranged with its face plane not parallel to a face plane of the finger operating surface area, or out of alignment with the finger operating surface area.

In one embodiment of the invention, the display field and/or the finger operating surface area is/are received outwardly flush or recessed in a receiving region of the device housing. This avoids the display field and/or the finger operating surface area protruding relative to the adjacent device housing and thereby forming a shoulder in the contour of the device housing. In alternative embodiments, the display field and/or the finger operating surface area are arranged protruding relative to an adjacent region of the device housing.

In a further embodiment of the invention, the device housing forms a closed frame around the display field and the finger operating surface area in the receiving region or partially surrounds these in a partial peripheral region. This constitutes an advantageous measure with respect to design and construction. The display field and the finger operating surface area may be protected by the device housing which forms the frame or in any case surrounds the two components on at least part of the periphery, e.g. protects these from impact and other mechanical influences which could lead to damage. In alternative embodiments, the display field or the finger operating surface area lie clear of the device housing on the periphery, e.g. in the form of a display and/or operating body protruding from the rest of the device housing.

In one embodiment of the invention, the treatment device comprises a receiving body of rubber-elastic material inserted in the receiving region, in which the operating element and/or the display field is/are received and framed. Depending on the implementation selected, with the rubber-elastic material, a good gap seal can be achieved at the edges of the operating element and/or display field against the surrounding device housing region, and/or the operating element and/or display field can be protected from impacts and other mechanical influences. In alternative embodiments, the operating element and/or the display field is/are inserted directly or with the use of a receiving body made of a bend-resistant material in the receiving region of the device housing.

In a refinement of the invention, the operating element has an actuation movement direction with a direction component in the housing circumferential direction and/or with a direction component perpendicular to the housing circumferential direction and perpendicular to the device longitudinal axis. This constitutes an advantageous configuration of the operating element with respect to operating comfort and handling of the operating element. The operating element may for example be actuated by a linear displacement movement or a pressing movement perpendicularly to the device longitudinal axis, or by a rotation or tilt movement about a rotation/tilt axis parallel to the device longitudinal axis. In alternative embodiments, the operating element may be actuated e.g. in a slide movement lying parallel to the device longitudinal direction.

In a refinement of the invention, at least one optical display element of the display field extends in the housing circumferential direction over the housing edge and/or with a curved or kinked course. With this arrangement, the advantage arises that this same display element can remain directly visible to the user in the different working positions of the device tilted relative to each other, since not only the display field as a whole but the display element(s) concerned run in a curved or kinked fashion or over the housing edge. In alternative embodiments, all optical display elements of the display field e.g. extend only over a rectilinear portion in the housing circumferential direction.

In a refinement of the invention, the display field has at least two optical display elements arranged next to each other in the housing circumferential direction and/or at least two optical display elements arranged next to each other in the device longitudinal direction. This constitutes a design of the display field which is favourable for many applications when equipped with several optical display elements.

In a refinement of the invention, the operating element is configured for switching between several selectable device operating states, and at least one optical display element of the display field has several display states corresponding to the selectable device operating states. This allows the user, by finger operation, to switch the treatment device between different operating states of the device, and to easily and directly detect the respective selected operating state via the display field. In alternative embodiments, the operating element may serve other purposes and/or another display field outside the display field serves to display device operating states.

In a refinement of the invention, the device housing has a main housing part and a handle housing part connected to the main housing part, and the display field is held on a retaining body which is attached to the main housing part and/or to the handle housing part and on which a second finger- or hand-actuatable operating element is held. This constitutes a structurally advantageous embodiment of the device housing and the holding of the display field. The retaining body holding the display field and the finger-operable operating element additionally serves for holding at least one further operating element. In alternative embodiments, the device housing may be constructed differently, and/or the display field and the operating element may be held in other ways, e.g. directly on a device housing part.

In a refinement of the invention, the treatment device is configured as a power saw with a handle arranged on a device top side, and the display field extends on the device top side and on a right display side. In this case, the power saw may in particular be of a so-called top handle type.

In an embodiment of the invention, the operating element is a push/tilt button element arranged on the device top side.

In this embodiment, the user can very easily actuate the operating element on the device top side with a push and/or tilt actuation, e.g. using his thumb. In particular in this case it is favourable if the operating element is situated to the left of the display field on the device top side, and the user grips the handle of the device with his right hand. With this actuation movement, the thumb then does not obstruct the user's clear view of the display field. In alternative embodiments, the operating element may e.g. be a touch-sensitive operating element.

In a different refinement of the invention, the treatment device is configured as a power saw with a handle arranged on a device rear side, and the display field extends on a device top side and a left device side. The power saw may here in particular be of a so-called rear handle type.

The display field's property of extending not only on the device top side but also on the left device side is favourable for this and other cases in which the power saw has an auxiliary handle extending on the left side in an arc from the top side to the underside, and the user frequently uses the power saw in a working position twisted by 90° clockwise, in which the left side is then at the top. Then in this rotated working position of the power saw, the user still has a direct view of the part of the display field situated on the left device side. In alternative embodiments, the display field extends for example on the device top side and a right device side.

In an embodiment of the invention, the operating element is a push/tilt button element arranged on the left device side. With this power saw type, this allows the user to actuate the operating element comfortably, e.g. with his right thumb, both in the normal working position with device top side at the top and in the working position tilted clockwise by 90° about the device longitudinal axis. Here, with his thumb, the user again exerts a suitable pressure and/or tilt actuation on the correspondingly designed operating element. In alternative embodiments, the operating element is arranged e.g. on the device top side or on the right device side, and/or using a different type of conventional operating element.

Other objects, advantages and novel features of the present invention will become apparent from the following detailed description of one or more preferred embodiments when considered in conjunction with the accompanying drawings.

DETAILED DESCRIPTION OF THE DRAWINGS

The figures show a hand-guided treatment device in embodiments as a power saw 13 of the rear handle type or a power saw 15 of the top handle type, wherein in this and other embodiments, the treatment device is configured for use in working positions tilted relative to each other by a tilt angle α of at least 45° about a device longitudinal axis L. In particular, in active saw operation, the power saws 13, 15 may be used in a normal working position with the saw chain 19 lying in a vertical plane and in a working position tilted by 90° clockwise about the device longitudinal axis L, and in all intermediate working positions.

The treatment device shown as an example in these implementations contains a device housing 1, a handle operating unit 2, and a display field 6 arranged on an outside 5 of the device housing 1 with at least one optical display element. In particular, in the exemplary embodiment of FIGS. 1 to 5, the display field 6 comprises seven optical display elements $7_1$ to $7_7$, in the exemplary embodiment of FIG. 6, five display elements $7_8$ to $7_{12}$, and in the exemplary embodiment of FIGS. 7 to 10, three display elements $7_{13}$ to $7_{15}$.

The handle operating unit 2 comprises a handle 3 extending with a main direction component parallel to the device longitudinal axis L, i.e. the handle 3 as a whole extends parallel to the device longitudinal axis L or in any case has a direction component along the device longitudinal axis L which is greater than a direction component perpendicular to the device longitudinal axis L. Furthermore, the handle operating unit 2 contains a finger-operable operating element 4 within finger reach of the handle 3, i.e. the operating element 4 can be operated or actuated by the user with a finger of the hand with which he grips the handle 3.

Corresponding to the respective saw type, in the power saws 15 of FIGS. 1 to 6, the handle 3 is arranged on a device rear side 15a, while in the power saw 13 of FIGS. 7 to 10, the handle 3 is arranged on a device top side 13a. In addition, the power saws 13, 15 have an auxiliary handle 21 extending on the left side in an arc from the top side to the underside, which makes it easier for the user to hold the power saw 13, 15 when using it in the working positions twisted about the device longitudinal axis L.

As evident for example from FIGS. 1, 2, 6 and 8, the display field 6 is arranged offset relative to the operating element 4 in a housing circumferential direction U about the device longitudinal axis L, and extends in the housing circumferential direction U over a housing edge 8 and/or with a curved or kinked course. The housing circumferential direction U lies in a plane perpendicular to the device longitudinal axis L.

In advantageous embodiments, as in the examples shown, the handle operating unit 2 comprises a finger operating surface area 9 in which the operating element 4 is situated, and the display field 6 contains a first display surface area 6a and a second display surface area 6b not parallel to the first. The finger operating surface area 9 and the first display surface area 6a are arranged aligned adjacent to each other. In addition or alternatively, they are arranged next to each other with mutually parallel face planes; both is realized in the examples shown.

Figure 1:
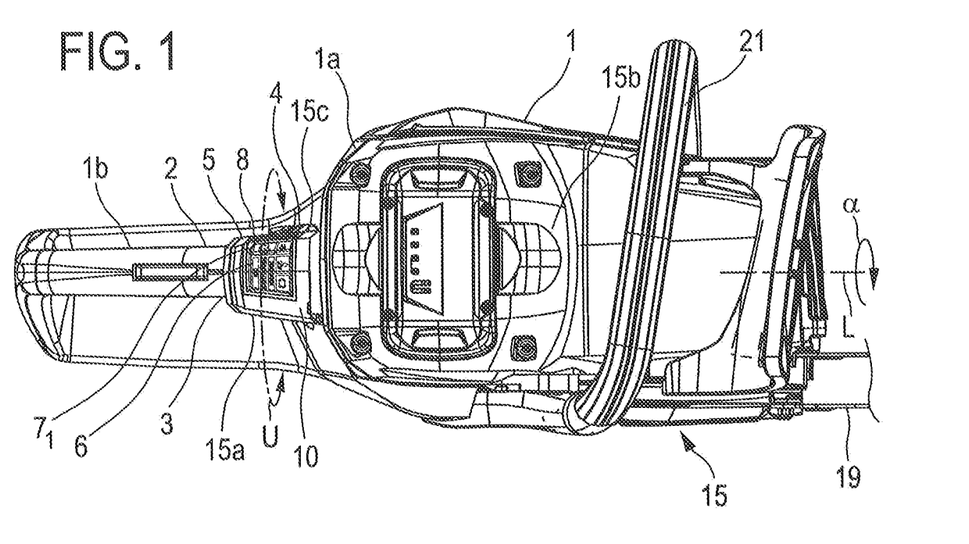
FIG. 1 shows a top view of a part of interest here of a power saw of the rear handle type.
Figure 2:
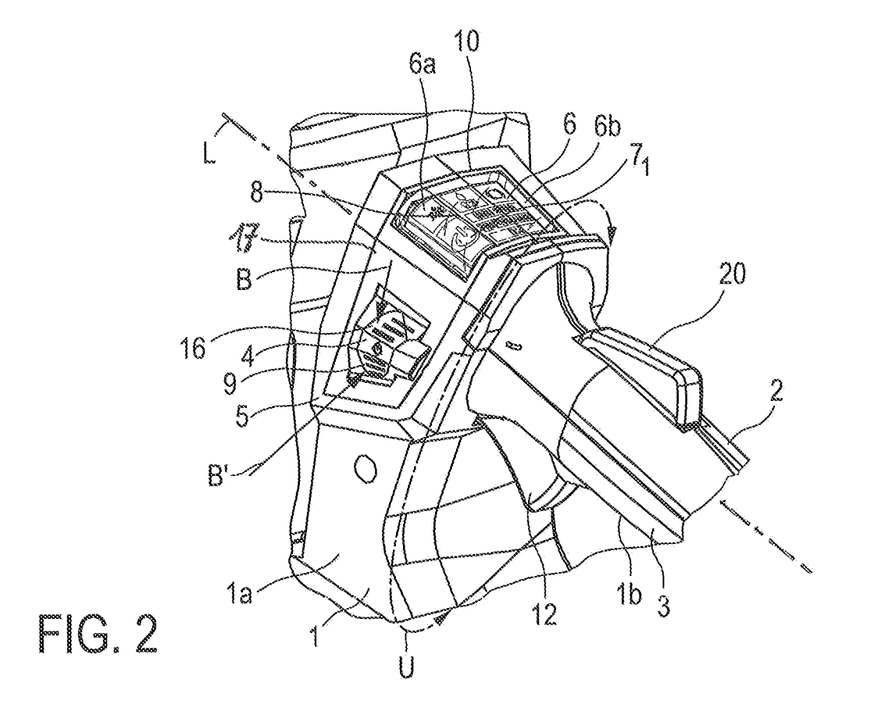
FIG. 2 shows a perspective, detail view of a handle and display region of the power saw from FIG. 1.
Figure 3:
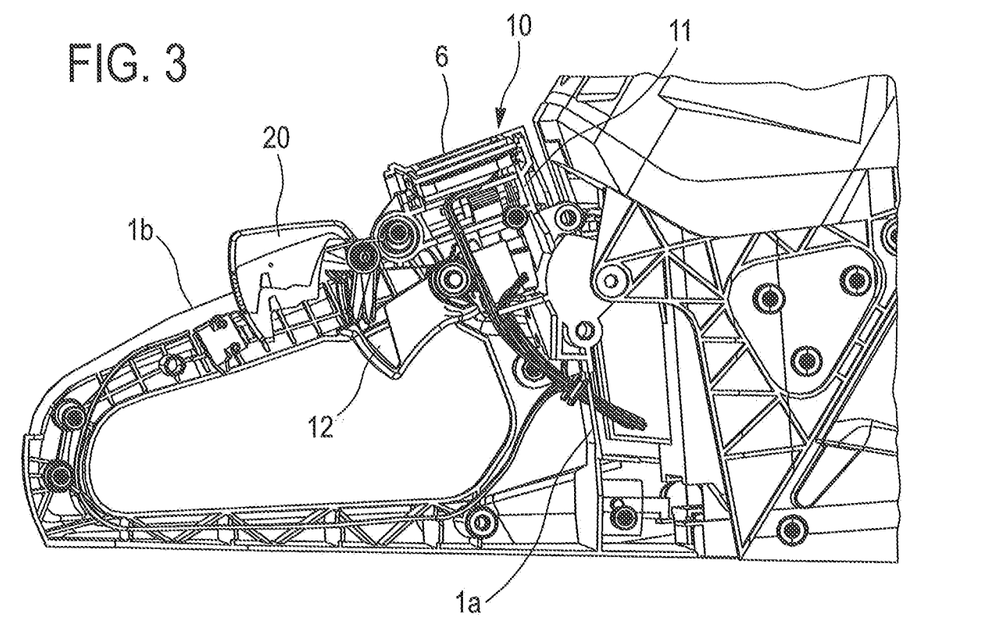
FIG. 3 shows a perspective illustration of part of a device housing of the power saw from FIG. 1 with retaining body attached thereto for holding a display field and operating elements.
Figure 4:
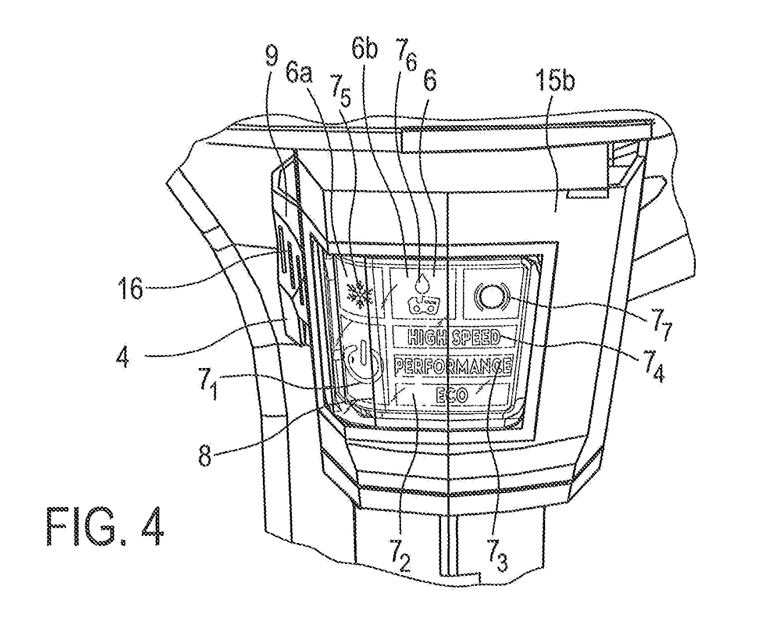
FIG. 4 shows a top view of a display and operating region of the power saw from FIG. 1.
Figure 5:
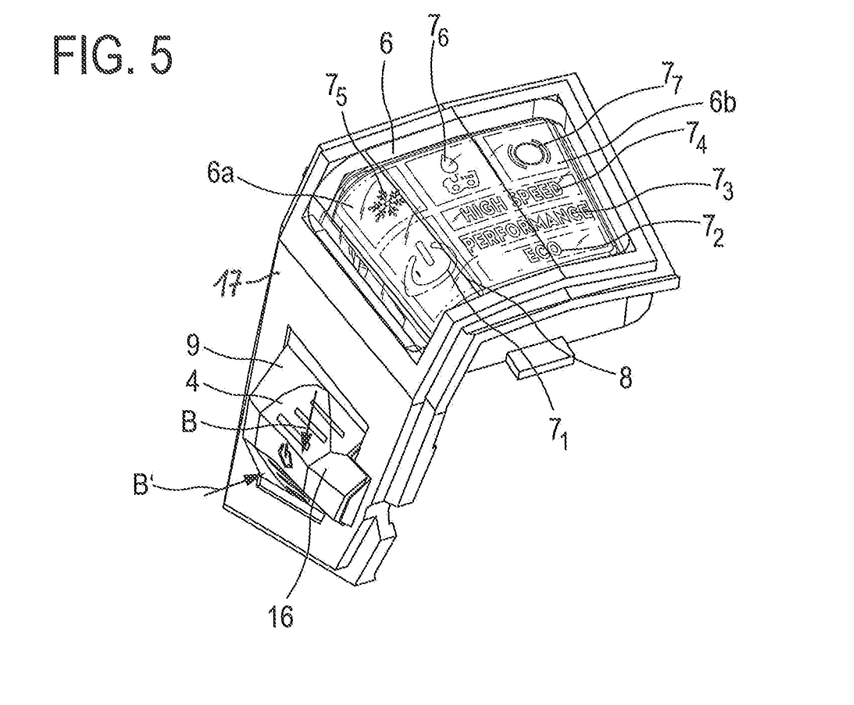
FIG. 5 shows a perspective view of the display and operating region from FIG. 4, separated from other device components.
Figure 6:
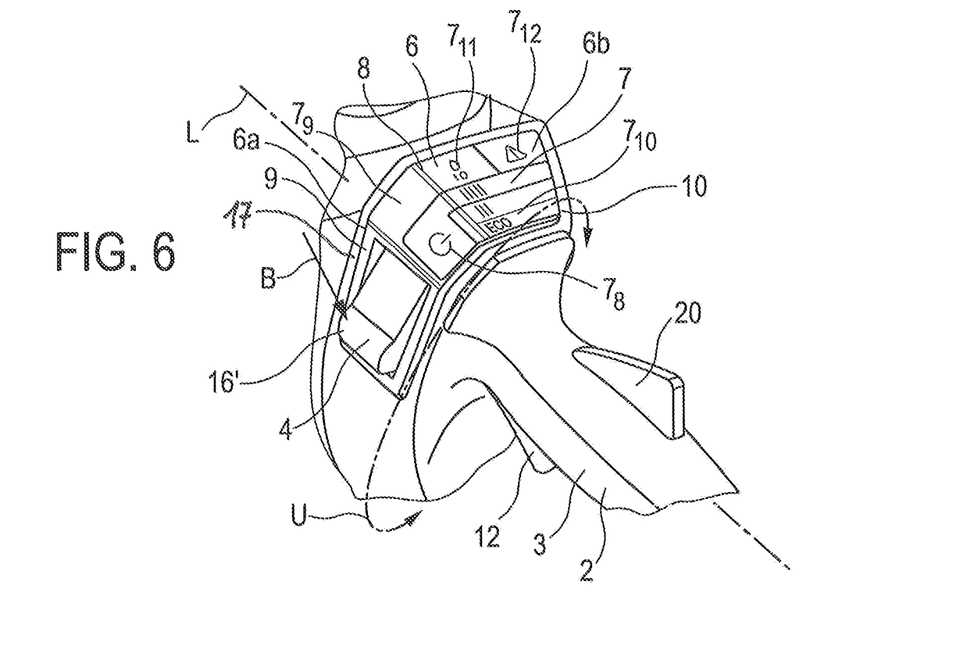
FIG. 6 shows a perspective view corresponding to FIG. 2 for a device variant with a modified design of display field and operating element.
Figure 7:
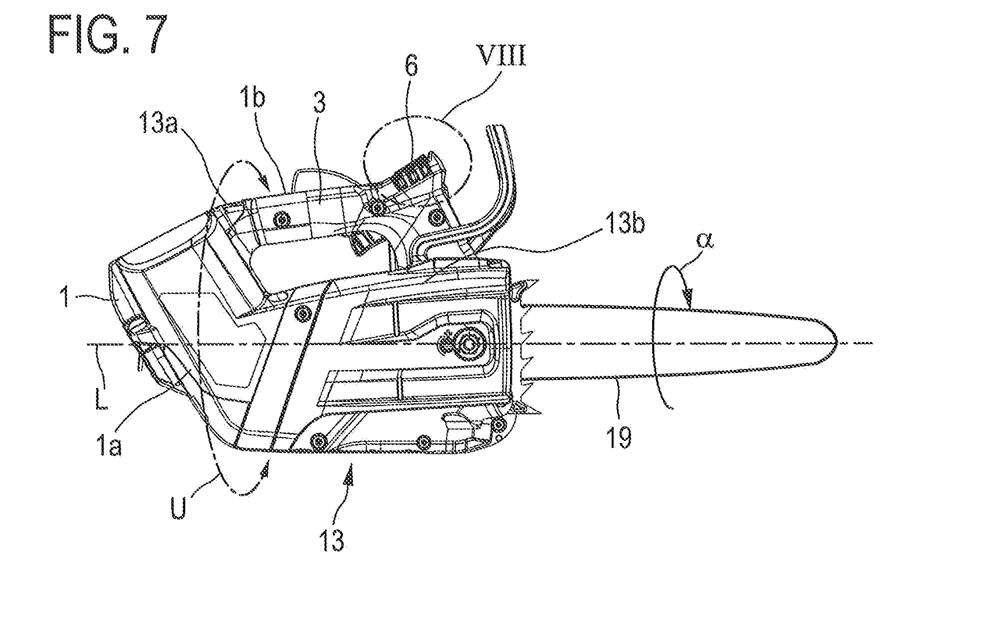
FIG. 7 shows a perspective side view of a power saw of the top handle type.
Figure 8:
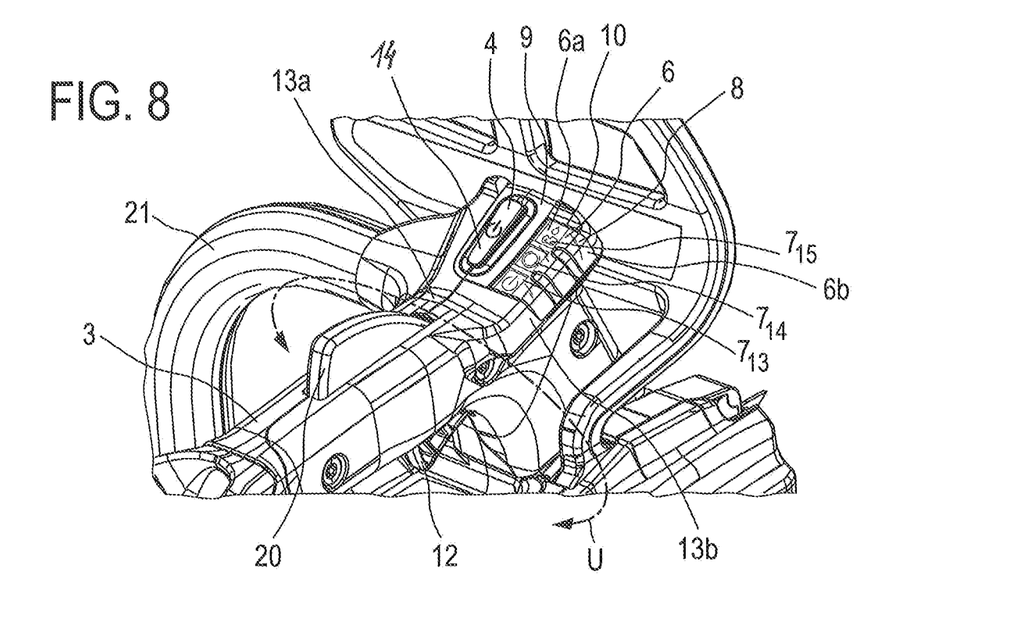
FIG. 8 shows a perspective detail view of a region VIII from FIG. 7.
Figure 9:
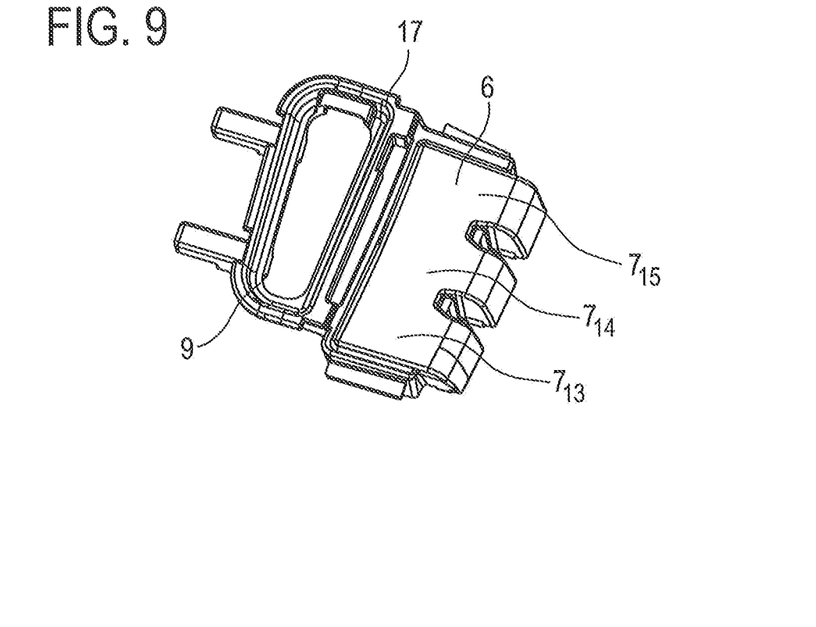
FIG. 9 shows a perspective top view of a display and operating unit used in the saw in FIG. 7, with the operating element omitted.

In particular, in the exemplary embodiments of FIGS. 1 to 6, the first display surface area 6*a* and the operating element 4 are situated on a left device side 15*c* of the power saw 15, while the second display surface area 6*b* extends on a device top side 15*b*. In the embodiments of FIGS. 1 to 5, the first and second display surface areas 6*a*, 6*b* adjoin each other or transform into each other at a tilt or arc angle of between around 60° and 90°. In the variant of FIG. 6, the first display field 6*a* and the second display field 6*b* adjoin each other at a tilt angle of around 30° to 60°. In the embodiment of FIGS. 1 to 5, the finger operating surface area 9 adjoins the first display surface area 6*a* with parallel faces; in the variant of FIG. 6, the finger operating surface area 9 is aligned with and adjoins the first display surface area 6*a* with a further tilt angle of e.g. between 30° and 60°.

In the exemplary embodiment of FIGS. 7 to 10, the first display field 6*a* and the operating element 4 are situated on the device top side 13*a* of the power saw 13, while the second display field 6*b* extends on a right device side 13*b*. In the example shown, the kink angle between the first and second display fields 6*a*, 6*b* is around 90°.

In corresponding embodiments, only the display field 6 or only the finger operating surface area 9, or, as in the examples shown, both components, are received in a receiving region 10 of the device housing 1 flush on the outside as in the examples shown, or recessed.

In corresponding embodiments, the device housing 1 surrounds the display field 6 and finger operating surface area 9 as a closed frame in the receiving region 10, as in the exemplary embodiments of FIGS. 1 to 6, or partially in a part peripheral region, as in the exemplary embodiment of FIGS. 7 to 10.

In advantageous embodiments, as in the examples shown of the power saws 13, 15, the treatment device has a receiving body 17 inserted in the receiving region 10 and made of a rubber-elastic material. In the exemplary embodiments of FIGS. 1 to 6, the operating element 4 and the display field 6 are received and framed in the receiving body 17; in the exemplary embodiment of FIGS. 7 to 10, only the operating element 4 is received and framed, or, in embodiments not shown, only the display field 6. In the exemplary embodiment of FIGS. 7 to 10, the display field 6 adjoins the rubber-elastic receiving body 17. The rubber-elastic receiving body 17 may provide a desired gap seal at the edge of the operating element 4 and/or the display field 6. Depending on implementation, in addition or alternatively it may absorb impact effects on the display field 6 and/or on the finger operating surface area 9.

In corresponding embodiments, the operating element 4 has an actuation movement direction with a direction component in the housing circumferential direction U, and/or with a direction component perpendicular to the housing circumferential direction U and perpendicular to the device longitudinal axis L. In the exemplary embodiment of FIGS. 1 to 5, the operating element 4 is a push/tilt button element 16 arranged on the left device side 15*c*, which the user may press e.g. with the thumb of his hand gripping the handle 3, either in a direction B from obliquely above or in a direction B' from obliquely below, whereby the operating element 4 is tilted or rotated by a predefinable, preferably relatively slight actuation movement about a tilt axis or rotation axis (not shown). This tilt/rotation actuation movement in this case has both a direction component in the housing circumferential direction U and a direction component radially inward, i.e. perpendicularly to the housing circumferential direction U and perpendicularly to the device longitudinal axis L.

In the embodiment variant of FIG. 6, the operating element 4 is a push/tilt button element 16' in the manner of a rocker switch arranged on the left device side 15*c*, i.e. this push/tilt button element 16' can be actuated by the user again in the direction B from obliquely above downward and radially inward, from its blocking tilt position shown in FIG. 6 into a second tilt position, from where it can then be moved back by a corresponding pressing actuation on its other rocker end face into the switch position shown in FIG. 6.

Figure 10:
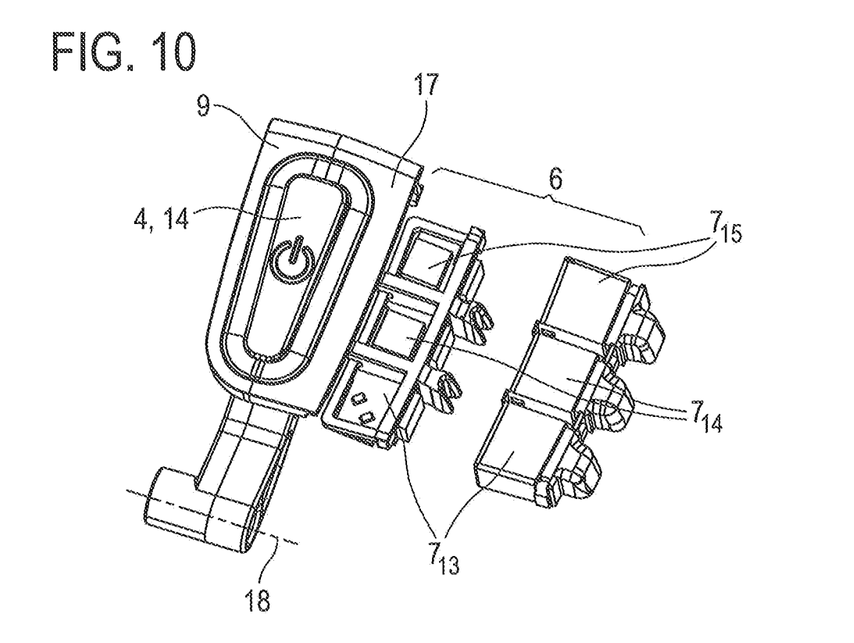
FIG. 10 shows an exploded illustration of the display and operating unit of FIG. 9 with operating element.

In the exemplary embodiment of FIGS. 7 to 10, the operating element 4 is a push/tilt button element 14 arranged on the device top side 13*a*, which can be tilted or rotated by a predefined, preferably relatively slight movement about a tilt/rotation axis 18 shown in FIG. 10.

In corresponding embodiments of the treatment device, at least one optical display element of the display field 6 extends over the housing edge 8 in the housing circumferential direction U, and/or with a curved or kinked course. Thus for example, in the exemplary embodiment of FIGS. 1 to 5, the display elements $7_1$ and $7_5$ extend in this fashion over the housing edge 8 with a kinked course. The five other display elements $7_2$ to $7_4$, $7_6$ and $7_7$ are situated in the display field 6 on the device top side 15*b*. In the exemplary embodiment of FIG. 6, the display elements $7_8$ and $7_9$ extend in this fashion over the housing edge 8 with kinked course, while the three other display elements $7_{10}$, $7_{11}$ and $7_{12}$ extend only on the device top side 15*b*, i.e. in the second display surface area 6*b*. In the exemplary embodiment of FIGS. 7 to 10, all three display elements $7_{13}$, $7_{14}$, $7_{15}$ extend over the housing edge 8 in a course which is bent or kinked through around 90° in the housing circumferential direction U, in both the first display surface area 6*a* on the device top side 13*a* and also in the second display surface area 6*b* on the right device side 13*b*.

As an alternative to such an over-edge course of a display element, it may be provided to operate two display elements in synchrony, one of which is situated in the first display surface area 6*a* and the other in the second display surface area 6*b*.

In corresponding embodiments, the display field 6 contains at least two optical display elements arranged next to each other in the housing circumferential direction U, and/or at least two optical display elements arranged next to each other in the housing longitudinal direction L. Thus in the exemplary embodiment of FIGS. 1 to 5, the display elements $7_5$, $7_6$, $7_7$ are arranged successively in the housing circumferential direction U, as are the display element $7_1$ and a respective one of the display elements $7_2$, $7_3$ and $7_4$. Also, in this example, the display elements $7_1$ and $7_5$ are arranged next to each other in the device longitudinal direction L, as are the display elements $7_2$ to $7_4$ and display element $7_6$ or display element $7_7$. In the exemplary embodiment of FIG. 6, inter alia, the display elements $7_9$, $7_{11}$ and $7_{12}$ are arranged next to each other in the housing circumferential direction U, and display elements $7_{10}$, $7_8$ and a respective one of the display elements $7_{11}$ and $7_{12}$ are arranged next to each other in the device longitudinal direction L. In the exemplary embodiment of FIGS. 7 to 10, the three display elements $7_{13}$ to $7_{15}$ are arranged next to each other in the device longitudinal direction L.

In corresponding embodiments, the operating element 4 is configured to switch between several selectable device operating states. For example, in the embodiments shown, the operating element 4 may be configured as a device activation switch by means of which the device can be switched from a fully deactivated operating state into a temporary activation state. During this period, via one or more further operating elements, the device may be set in active operation, e.g. by starting a drive motor which sets the saw chain 19 of the power saw 13, 15 in rotation.

At least one optical display element of the display field 6 has display states corresponding to the selectable device operating states. Thus FIG. 6 shows the display element $7_8$ in an active display illuminated state which in this exemplary embodiment indicates the aforementioned temporary activation state. Similarly, this device state may be indicated in the embodiments of FIGS. 1 to 5 e.g. by illumination of the display element $7_1$, and in the embodiment of FIGS. 7 to 10 by illumination of the display element $7_{13}$, which means that this display information appears both on the first display surface area 6a and on the second display surface area 6b.

In corresponding embodiments, as in the examples shown, the device housing 1 comprises a main housing part 1a and a handle housing part 1b connected to the main housing part 1a, and the display field 6 and operating element 4 are held on a retaining body 11 which is attached to the main housing part 1a and/or to the handle housing part 1b, and on which a second finger- or hand-actuatable operating element 12 is held.

In the exemplary embodiments shown, the second operating element 12 functions as a throttle lever or power regulator for the drive motor of the saw chain 19, as known in itself in power saws of this type. Furthermore, in these power saws 13, 15, also in a fashion known in itself, a third hand-actuatable operating element 20 is provided which is configured as a so-called blocking lever, wherein in the examples shown this third operating element 20 is also preferably held so as to be pivotable on the retaining body 11.

As the exemplary embodiments shown and explained above clearly illustrate, the invention provides a hand-guided treatment device in which, in highly advantageous fashion, a finger-operable operating element is provided within finger reach of the handle to be gripped by a user's hand, and a display field which is arranged offset to the operating element in a housing circumferential direction about a device longitudinal axis and extends in the housing circumferential direction over a housing edge and/or with a curved or kinked course.

In this way, one or more items of display information may be optically displayed on the display field such that they are clearly visible to the user in different working positions tilted by a tilt angle about the device longitudinal axis. The treatment device may for example be a power saw or another gardening or forestry treatment device, or a handheld power tool used in the construction and DIY sectors.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hand-guided treatment device configured for use in working positions tilted relative to each other by a tilt angle of at least 45° about a device longitudinal axis, comprising:
    a device housing;
    a handle operating unit which comprises a handle extending with a main direction component parallel to the device longitudinal axis and a finger-operable operating element within finger reach of the handle; and
    a display field which comprises at least one optical display element, wherein
    the display field is arranged on an outside of the device housing and offset relative to the finger-operable operating element,
    the offset is in a housing-circumferential direction around the device longitudinal axis, and
    the display field extends in the housing-circumferential direction over a housing edge or with a curved or kinked course.

2. The hand-guided treatment device according to claim 1, wherein
    the handle operating unit has a finger operating surface area in which the operating element is situated,
    the display field contains a first display surface area and a second display surface area not parallel to the first, and
    the finger operating surface area and the first display surface area are arranged aligned adjacent to each other and/or next to each other with mutually parallel face planes.

3. The hand-guided treatment device according to claim 2, wherein
    at least one of the display field or the finger operating surface area is received outwardly flush or recessed in a receiving region of the device housing.

4. The hand-guided treatment device according to claim 3, wherein
    the device housing forms a closed frame around the display field and the finger operating surface area in the receiving region or partially surrounds these in a partial peripheral region.

5. The hand-guided treatment device according to claim 3, further comprising:
    a receiving body of rubber-elastic material inserted in the receiving region, in which at least one of the operating element or the display field is received and framed.

6. The hand-guided treatment device according to claim 1, wherein
    the operating element has an actuation movement direction with at least one of a direction component in the housing circumferential direction or a direction component perpendicular to the housing circumferential direction and perpendicular to the device longitudinal axis.

7. The hand-guided treatment device according to claim 1, wherein
    at least one optical display element of the display field extends in the housing circumferential direction over the housing edge or with a curved or kinked course.

8. The hand-guided treatment device according to claim 1, the display field has at least two optical display elements arranged next to each other in the housing circumferential direction.

9. The hand-guided treatment device according to claim 1, wherein
    the display field has at least two optical display elements arranged next to each other in the device longitudinal direction.

10. The hand-guided treatment device according to claim 1, wherein
    the operating element is configured for switching between a plurality of selectable device operating states, and
    at least one optical display element of the display field comprises a plurality of display states corresponding to the selectable device operating states.

11. The hand-guided treatment device according to claim 1, wherein the device housing has a main housing part and a handle housing part connected to the main housing part, and the display field and the operating element are held on a retaining body which is attached to at least one of the main housing part or the handle housing part and on which a second finger-actuable or hand-actuatable operating element is held.

12. The hand-guided treatment device according to claim 1, wherein the device is configured as a power saw with a handle arranged on a device top side, and the display field extends on the device top side and on a right display side.

13. The hand-guided treatment device according to claim 12, wherein the operating element is a push/tilt button element arranged on the device top side.

14. The hand-guided treatment device according to claim 1, wherein the device is configured as a power saw with a handle arranged on a device rear side, and the display field extends on a device top side and a left device side.

15. The hand-guided treatment device according to claim 14, wherein the operating element is a push/tilt button element arranged on the left device side.

* * * * *